April 7, 1964      R. G. FRIEDMAN      3,127,626
PUNCH KNOCK-OUTS FOR DOUBLE-BLOW HEADER
Filed Nov. 1, 1960      7 Sheets-Sheet 1

Fig. 1

INVENTOR.
ROBERT G. FRIEDMAN
BY
RICHEY, McNENNY & FARRINGTON
Donald W. Farrington
ATTORNEYS

Fig. 2

April 7, 1964 R. G. FRIEDMAN 3,127,626
PUNCH KNOCK-OUTS FOR DOUBLE-BLOW HEADER
Filed Nov. 1, 1960 7 Sheets-Sheet 5

INVENTOR.
ROBERT G. FRIEDMAN
BY
RICHEY, McNENNY & FARRINGTON
ATTORNEYS

United States Patent Office 3,127,626
Patented Apr. 7, 1964

3,127,626
PUNCH KNOCK-OUTS FOR DOUBLE-BLOW
HEADER
Robert G. Friedman, Tiffin, Ohio, assignor to The National Machinery Company, Tiffin, Ohio, a corporation of Ohio
Filed Nov. 1, 1960, Ser. No. 66,494
3 Claims. (Cl. 10—12.5)

This invention relates to double-blow headers and more particularly to apparatus providing knock-outs for the punches on a double-blow header whereby headed articles, such as bolts, may be made on a single-die header, which articles were made according to the prior art apparatus on multiple-die headers or a number of separate bolt making machines. A "double-blow header," as used herein, refers to a machine for making bolts, or the like, wherein a cut length of stock is placed in a holding die in the die breast and a reciprocating header slide is provided with an oscillating tool holder so that each tool of a pair of tools carried on the holder is alternately brought into engagement with the blank in the holding die so that one headed article is completed in two strokes of the header slide.

The present invention is disclosed in the environment of a double-blow header of the type covered by Friedman Patent No. 2,599,053, issued June 3, 1952, and owned by the assignee of the instant application. The present invention is also well suited for use with the high speed, double-blow header disclosed and claimed in my co-pending application Serial No. 786,805, filed January 14, 1959, now Patent No. 3,031,698, issued May 1, 1962. It will be understood as the description of the present invention proceeds that other types of double-blow headers currently available may be used with the apparatus of the instant invention.

A type of headed fastener which is characterized by a large volume head portion and a short narrow low volume shank is currently used in large quantities and it has heretofore been found to be difficult or impossible to make such headed fasteners on a double-blow header. The reason for the difficulty results from the fact that the enlarged head portion is frictionally engaged within the walls of the tool employed for the second blow and the friction grip of the tool on the head of the blank is greater than the grip of the bed frame die on the shank of the blank with the result that the blank is seized in the tool carrying out the second blow. The frictional grip of the header slide tool on the blank also occurs in some instances in the tool employed for the first blow, that is, the gathering or coning operation forming the head of the blank. For these reasons, such fasteners have been restricted in manufacture to the progressive type of header having several die stations and transfer mechanisms between the die stations. According to the present invention I have provided apparatus which completes the formation of such fastener blanks in two blows on the double-blow header and thus makes such fasteners at a high rate of speed and on a low cost machine.

It is among the objects of the present invention to provide a double-blow header having an oscillating punch or tool carrier mounted on the header slide and wherein each of the two punches mounted on the punch carrier is provided with a knock-out and wherein said knock-outs are moved relative to the punch during each cycle of punch movement into engagement with the blank in the die breast.

It is a further object of my invention to provide a double-blow header according to the preceding object wherein rocking levers are carried by the tool carrier and one rocking lever is in operative engagement with the first punch and a second rocking lever is in engagement with the second punch and wherein the bed frame of the double-blow header is provided with an oscillating member adapted to be moved into the reciprocating path of one of said levers and wherein said levers are alternately rocked by said oscillating member on alternate strokes of the header slide so that during the final phase of one punch operation on the blank in the bed frame die, the knock-out within the punch moves relative to the punch and in some cases relative to the die breast so as to free the blank being worked with respect to the punch.

It is a further object of my invention to provide a double-blow header having at least two punch knock-outs which are moved at the conclusion of its heading blow and wherein differently shaped levers are provided which vary the extent and dwell of the knock-out movement in one punch relative to the extent and dwell of the knock-out movement in the other punch.

It is a further object of my invention to provide a double-blow header according to the preceding object wherein a single reciprocating member moving in a uniform cycle in phase with the header slide engages the knock-out levers in an alternate position.

It is a further object of my invention to provide a double-blow header having a half-speed shaft driven by the crankshaft and means operatively connected to the half-speed shaft to oscillate a tool holder carried by the header slide and wherein a reciprocating member disposed longitudinally of the frame makes one complete reciprocation at each turn of the crankshaft and wherein a second oscillating shaft is carried by the bed frame transversely of said first oscillating shaft and is operatively connected thereto so that the second shaft is driven by the first shaft, said second shaft projects into the path of knock-out levers carried by the punches on the tool carrier whereby one or the other of such knock-out levers is moved at each reciprocating stroke of the header slide.

Further objects and advantages relating to the manufacture of articles which could not heretofore be made in a double-blow header and advantages relating to the low cost manufacture of headed articles and ruggedness in construction and efficiency in operation will appear from the following description and the appended drawings wherein:

According to the present invention a double-blow header is provided wherein the die breast is characterized by a single holding die. Conventional feeding and shearing means, not illustrated in the instant case, are employed to cut a length of stock and transfer the cut length into the single holding die of the die breast. The feeding and shearing means may be of the type shown in said Friedman patent, or other types known to those skilled in the art may be used to cut off the desired stock length and transfer the cut length to the holding die.

Figure 1:
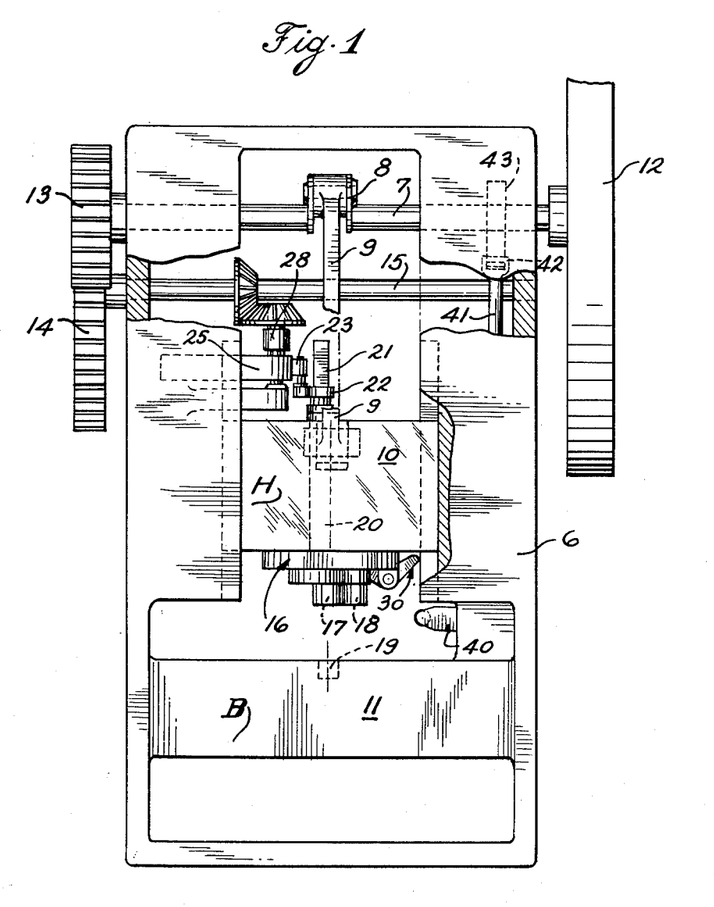
FIG. 1 is a plan view of a double-blow header provided with punch knock-out apparatus made according to the present invention.

Referring to the drawings, the double-blow header shown in FIG. 1 corresponds generally to the arrangement of parts shown in said Friedman patent wherein a bed frame 6 is provided with a crankshaft 7 having a crank 8 arranged to drive a pitman 9 to reciprocate the header slide 10 toward and away from the die breast 11. The crankshaft 7 is provided with a fly wheel 12 at one side of the bed frame and a pinion 13 at the other side of the bed frame arranged to drive a gear 14 at a one-to-two ratio which rotates the half-speed shaft 15.

The half-speed shaft is arranged to oscillate a tool holder indicated in its entirety as at 16 so that the punch holders 17 and 18 carried by the tool holder are alternately brought into alignment with the holding die 19 in the die breast 11. The means for advancing a length of stock, shearing the stock and transferring a cut blank to the holding die 19 form no essential part of the present invention and have been omitted from the drawings in this application for purposes of clarity.

The tool holder 16 is provided with a longitudinally disposed shaft 20 mounted for rotation in the header slide 10. The shaft 20 is provided with an integrally formed section 21 projecting rearwardly of the header slide and the section 21 is preferably provided with a square crosssection so that it may slide axially within a drive member 22 having a square cross-sectional opening.

Figure 2:
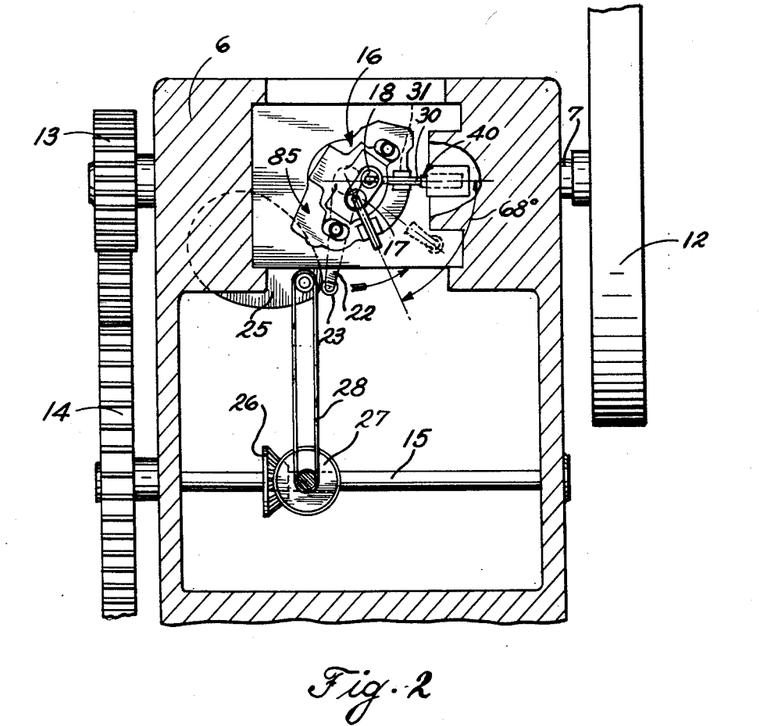
FIG. 2 is a transverse elevation with parts in section showing the half-speed shaft drive means for oscillating the punch carrier.

The member 22 in the device shown in FIGS. 1 and 2 is in the form of a depending lever having cam follower roller 23 at the lower end thereof adapted to engage a cam 25. The lower end of the lever 22 is spring-biased against the periphery of cam 25. The drive for the cam 25 includes a beveled gear 26 secured to the half-speed shaft 15 and a meshing beveled gear 27 having a sprocket carried thereby to drive a chain 28 arranged over a sprocket fixed to the cam 25. The sprocket on the beveled gear 27 is the same size as the sprocket carried by the cam 25 and, since the beveled gears 26 and 27 are the same size, the cam 25 turns in synchronism with the halfspeed shaft 15. Accordingly after one of the punches such as, for example, the punch in punch holder 17 has completed a heading blow against the blank in the holding die 19, the tool holder 16 is rocked through an angle of about 68° so as to bring the other punch in punch holder 18 into alignment with the blank in the holding die 19 for the second blow. The mode of operation thus far described is characteristic of double blow headers.

According to the present invention each of the punches in the punch holders 17 and 18 is provided with a knockout or similar metal working tool movable relative to the punch and thus the machine of my invention is provided with apparatus for moving the knock-outs after a heading blow so as to perform other working or holding operations on the blank in the heading die. Generally speaking, the apparatus (see FIGS. 4 and 5) includes a lever 30 mounted on the tool holder 16 as at pivot 31. One end of this lever, as at 32, terminates within the tool holder assembly where said end 32 is operatively engaged with a knock-out such as that illustrated in FIG. 3. One end portion 32 of the lever 30 extends within the tool holder and swings through the angle indicated in dotted lines in FIG. 3. The other end of the lever 30, as at cam surface 35, is adapted to be engaged by a reciprocating bar assembly indicated in its entirety as at 40. As the header slide 10 recedes from the die breast, the lever 30 returns to its full line position.

Figure 3:
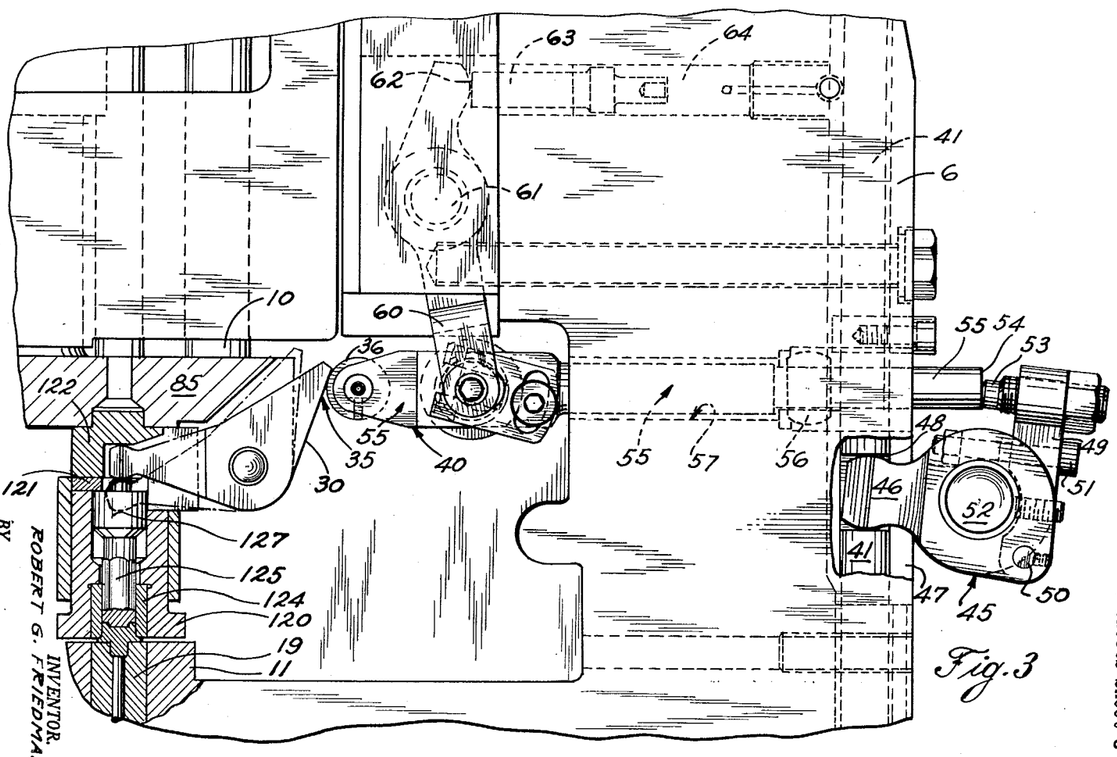
FIG. 3 is a plan view with parts in section showing details of the apparatus for moving the knock-outs in the punches mounted on the punch carrier.
Figure 4:
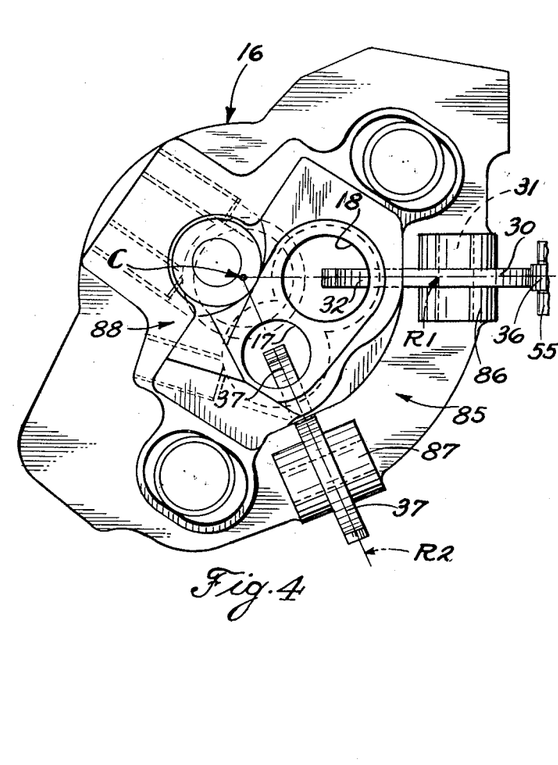
FIG. 4 is an elevation showing the location of the punch carrier and the operative relationship between the knock-out lever and the lever operating means at the conclusion of the first heading blow.

The end of the bar assembly 40 adjacent the pivoted lever 30 is provided with a roller 36 and it will be understood by reference to FIG. 3 that when the bar assembly 40 is reciprocated and the lever 30 is in the path of the roller 36, the lever 30 will be rocked about its pivot 31 and thus determine the position of the knock-out 34 with respect to the die breast 11 and the punch.

A lever 37 pivotally mounted at 87 on tool holder 16 is associated in the same manner with the punch in the other punch holder 17.

A reciprocating member 41 is arranged longitudinally within the bed frame as shown in FIGS. 1 and 3 and the end thereof adjacent the crankshaft 7 is provided with a cam follower or roller 42 adapted to engage a cam 43 carried by the crankshaft 7. The longitudinally disposed member 41 is spring-biased toward the crankshaft 7 and the cam 43 is timed with respect to the header slide so that the member 41 will be moved toward the die breast 11 when the header slide has moved one of the levers 30 or 37 into the path of the bar assembly 40. The reciprocating movement of the bar 41 is transmitted to the bar assembly 40 by the apparatus best shown in FIG. 3.

A bell crank member 45 is pivoted at the side of the bed frame 6 and includes an arm 46 projecting through a slot 47 in the bed frame and operatively arranged in an opening 48 in the bar 41. The other arm of the bell crank, namely, arm 49, is pivoted to the bell crank body as at 50 and is held in operative relation as shown by a tie bolt 51. Normal operation of the bell crank assembly 45 provides an oscillating or rocking of the bell crank assembly about the pivot 52. Such movement in a counter-set clockwise direction causes the adjustably mounted tappet member 53 to engage the end face 54 of the reciprocating rod 55 and thus move the rod 55.

The rod 55 is mounted in the bed frame for reciprocation and tilting in a spherical bearing 56. The passageway 57 through the bed frame is formed to provide clearance at each side of the rod 55 so that the rod 55 may tilt within limits on the spherical bearing 56. Accordingly, it will be understood that the bar 55 is characterized by both sliding and tilting motions with respect to the spherical bearing 56. The tilting of the rod 55 results from the arcuate path of the end of the rocker member 60.

The end of the rod 55 disposed within the bed frame and adjacent the header slide is pivotally connected to a rocker member 60 which is in turn pivotally mounted in the bed frame as at 61. One end of the rocker member 60, as at 62, is arranged to bear against the end of a spring-biased plunger 63. The spring assembly indicated at 64 normally biases the lever 60 about the pivot 61 in a counter-clockwise direction and thus maintains the end 54 of the bar 55 in contact with the member 53 carried by bell crank assembly 45.

Figure 3A:
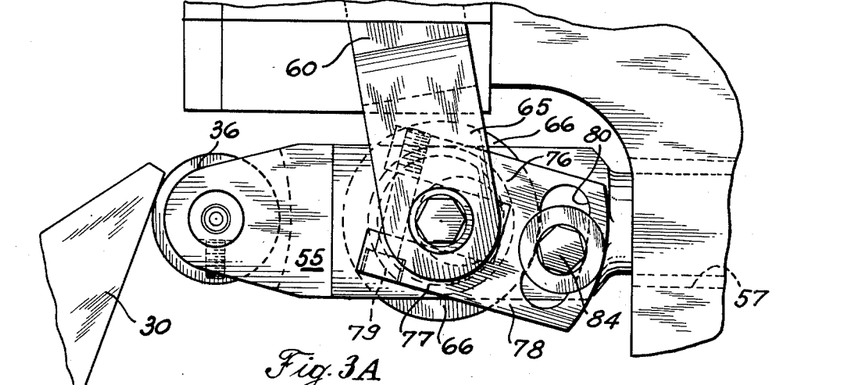
FIG. 3A is a detailed showing of the operative engagement between the knock-out lever carried by the header slide and the reciprocating means for actuating the lever mounted in the bed frame.
Figure 3B:
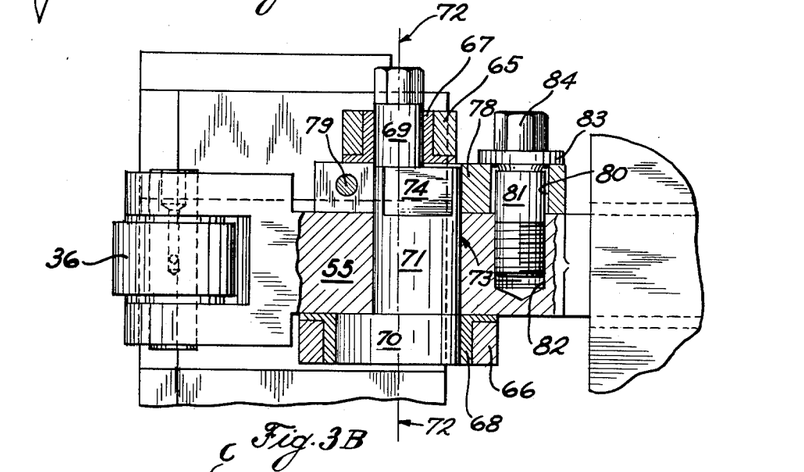
FIG. 3B is an elevation with parts in section of the mechanism of FIG. 3A.

The connection between the lever 60 and the rod 55 is characterized by the adjusting mechanism best shown in FIGS. 3A and 3B. The end of the lever 60 is shaped to provide upper fork member 65 and lower fork member 66. A bushing 67 is carried within the upper fork 65 and a large bushing 68 is carried within the lower fork 66 and said bushings are concentrically arranged and provide a pivotal connection with the upper boss 69 and the lower boss 70. The upper and lower bosses 69 and 70 are integrally formed on a vertically disposed body 71 which is eccentric of the pivot axis 72 extending through the bosses 69 and 70.

The body portion 71 is rotatably received within a bore 73 in the bar 55. The body 71 is provided with flattened portions at its upper end as at 74 and the opposed flattened portions are adapted to be embraced by arms 76 and 77 integrally formed with the adjusting plate 78. The arms 76 and 77 are drawn into tight clamping engagement with the flats on the body 71 by means of the bolt 79.

The adjusting plate 78 is provided with a slot 80 and a cap-screw 81 is received in a threaded bore 82 in the bar 55. A washer 83 is interposed between the head 84 of the cap-screw 81 and the bar 55 so as to grip the adjusting plate frictionally when the cap-screw 81 is drawn up. By loosening the cap-screw 81 and moving the adjusting plate 78 as provided by the slot 80, the body portion 71 is turned within the bar 55 and, since the body 71 is eccentric with respect to the axis 72, the entire bar 55 is rocked about the spherical bearing 56 in the bed frame. It will be understood as the description proceeds that such adjustment of the adjusting plate 78 results in changing the location of the roller 36 carried by the bar 55 in relation to the horizontal path of the levers 30, 37 carried by the tool holder in the header slide.

The tool carrier assembly, indicated in its entirety as at 16, includes a carrier plate 85 having angularly spaced bosses 86 and 87 integrally formed therewith. The lever 30 extends radially of the carrier plate 85 and terminates within the cyclindrical opening comprising the punch holder 18. The center of rotation of the carrier plate 85 is at C. The radius locating lever 30 is indicated at $R_1$ and the radius locating lever 37 at $R_2$. The tools carried in punch holders 17 and 18 will be varied in accordance with the particular article being formed and, in the illustration of the instant application, the punch holders 17 and 18 receive the tools for making a hex washer head bolt. The cylindrical opening for punch holder 17 is, in the instant application, adapted to receive the coning or gathering punch which strikes the first heading blow on the blank. Accordingly, in FIG. 4, the tool carrier 85 is arranged so that the finish tool in holder 18 is in alignment with the bed frame die and thus the lever 30 is arranged to move certain elements in the finish tool in response to movement of the roller 36 relative to the tool carrier.

Figure 5:
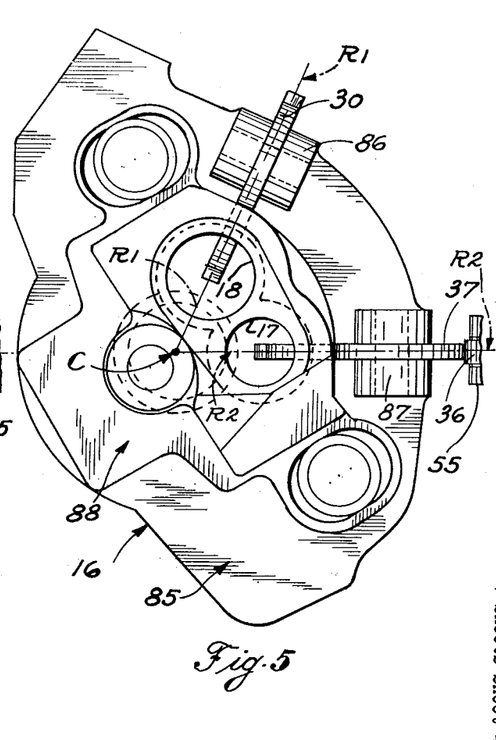
FIG. 5 is a view similar to FIG. 4 showing the position of the punch carrier and the knock-out lever of the second punch at the conclusion of the second heading blow.
Figure 6:
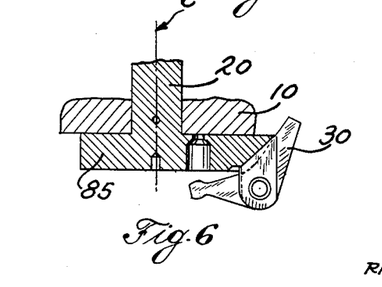
FIG. 6 is a sectional view with parts broken away showing the pivotal mounting of the knock-out lever on the punch carrier and the mounting of the punch carrier in the header slide.
Figure 7:
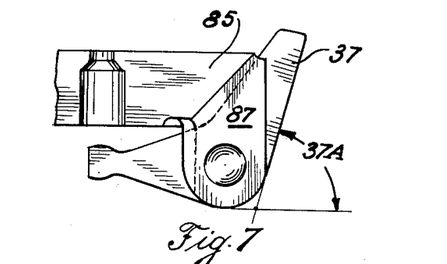
FIG. 7 is a fragmentary elevation showing the knockout lever for the cone punch used in the first blow of the double blow header in FIGS. 9–12.
Figure 8:
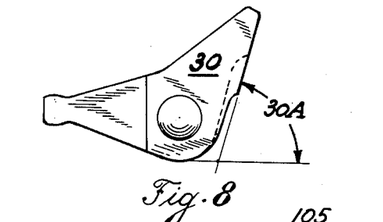
FIG. 8 is a similar view showing the knock-out lever for the finish punch used in the second blow of the double blow header in FIGS. 9–12.

A punch holder casting as indicated at 88 is secured to the carrier plate 85 and the punch assembly for the holders 17 and 18 is mounted as illustrated in FIG. 3. The lever 37 is pivotally mounted in the boss 87 and the inner end thereof is arranged through a slot in the side of tool holder 17 so as to terminate centrally of the punch holder 17. In FIG. 5 the lever 37 is shown as being in operative engagement with the roller 36 caried by the rod 55. This corresponds to the coning or gathering blow which is the first heading blow applied to the blank in the bed frame die 19.

It will be understood that the apparatus of the instant invention is provided primarily to move certain tools axially within the punch holders in a double-blow header as a part of the metal forming operation and effect such tool movement independently of the movement of the header slide which carries the punches. Accordingly, the detailed description included here with respect to FIGS. 9–12, inclusive, illustrates a way in which the apparatus of my invention may be utilized to form a hex washer head bolt.

Figure 9:
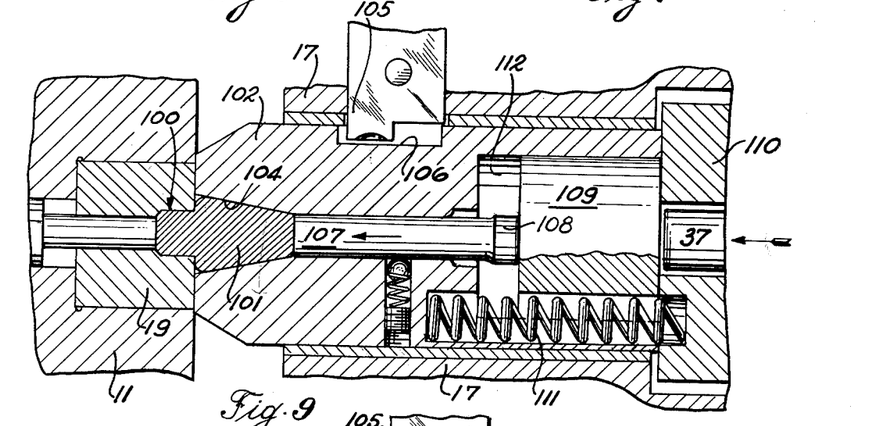
FIG. 9 is a fragmentary sectional view of a double blow header which incorporates the knock-out arrangement of the present invention and showing the cone tool at the end of its forward stroke in the first blow of the header.

It will be understood from the illustrations here that the apparatus of my invention is well adapted for the shaping of numerous articles in a double-blow header. In FIG. 9 an originally cylindrical bolt blank 100 is being held in the die 19 in die breast 11. The first header slide punch 102 carried in holder 17 has been advanced so as to surround the end of the blank projecting from the die breast 11. The recess indicated at 104 is adapted to receive the upset head portion of the blank. The tool 102 has been advanced into the position shown by reason of the connection at 105 in the punch holder and notch 106 in the tool 102.

The position of the parts illustrated shows the knock-out 107 as having been advanced to its maximum forward position relative to the die breast 11. The knock-out 107 may move axially relative to the tool 102 as permitted by space 112. Knock-out 107 includes an enlarged head 108 at one end engaged by a back up member 109 slidable in the punch 102. In the position of the parts shown in FIG. 9, both the back-up member 109 and punch 102 are engaged by a part 110 which is solidly backed up in the header slide by the plate 85. A series of springs 111 are engaged under compression between punch 102 and the part 110. Lever 37 is positioned to engage back-up member 109.

It will be understood that, prior to the coning blow, a portion of the cylindrical bolt blank 100 extended up into the opening 110 in which the knock-out 107 moves and that the full advance of the knock-out 107 upsets the said portion into the recess 104 so as to form the enlarged upset head 101. The upsetting load is transmitted through plate 85 on the header slide.

Figure 10:
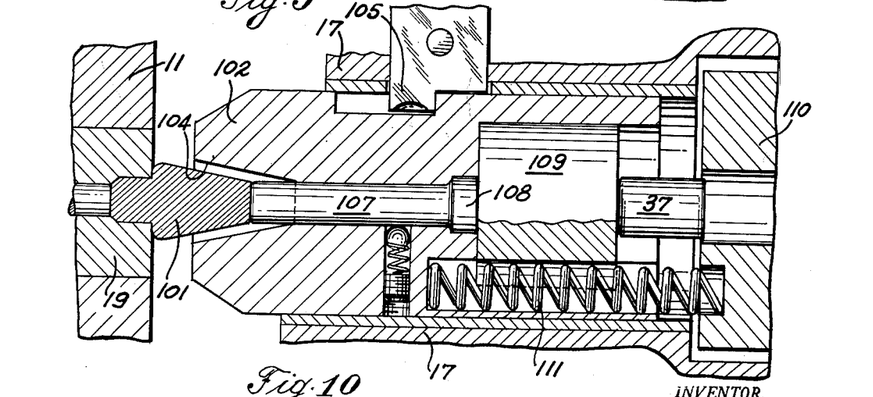
FIG. 10 is a similar view showing the cone tool being retracted after the first blow and showing the knock-out lever for the cone tool actuated to disengage the blank from the cone tool.

As the header slide recedes from the die breast 11, as shown in FIG. 10, the coupling 105 is moved away from the die breast until it engages the end of the notch 106 and thereupon withdraws the tool 102 relative to the die breast 11. As the tool or punch 102 begins to move away from the die breast, however, the lever 37 is rocked by the mechanism described above so as to advance the knock-out 107 relative to the tool or punch 102. This means that the knock-out 107 now serves to hold the head 101 of the blank against the die breast as the header slide tool 102 recedes. Those skilled in the art will appreciate that blanks having very small shanks will provide very little friction for holding the blank in the bed frame die 19 upon retraction of the header slide. It will also be understood that the enlarged head portion relative to the small shank will result in a firm frictional gripping of the head 101 by engagement with the punch 102. With the apparatus of my invention, however, the knock-out 107 holds the blank which has been headed positively in the die breast 11 so that the blank is ready for the next forming operation. It will be noted that the space 112 between the end of the punch 102 and the enlarged section 107 accommodates the advancing motion of the knock-out back-up member 109 relative to the punch 102.

After the heading operation is effected by punch 102 and the knock-out 107, the header slide retracts to its maximum back dead center position and, upon its forward travel following the heading blow, the tool holder 16 is rocked about its pivot by means of cam 25 so as to position the other punch holder 18 in alignment with the bed frame die 19. This means that the tool holder assembly 16 will be swung to the position illustrated in FIG. 4 wherein the knock-out lever 30 is in alignment with the roller 36 on shaft 55 so as to effect the next bolt-forming operation.

Figure 11:
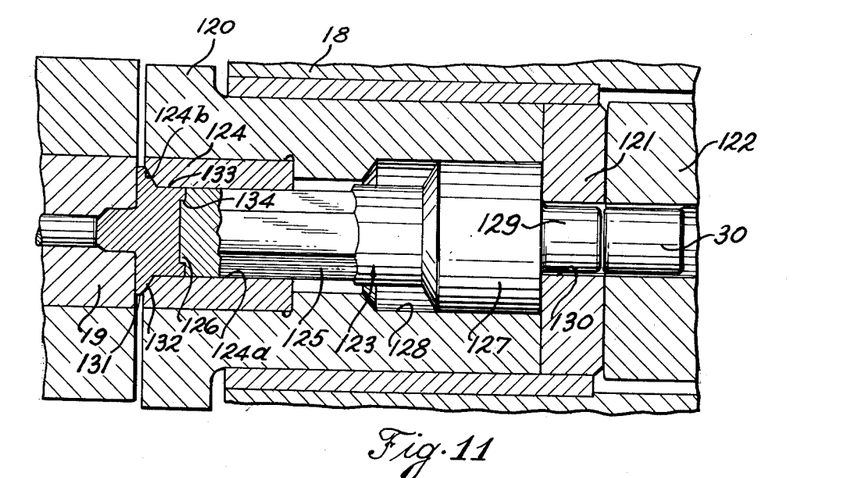
FIG. 11 is a similar view showing the finish tool in the double blow header at the conclusion of its forward stroke.
Figure 12:
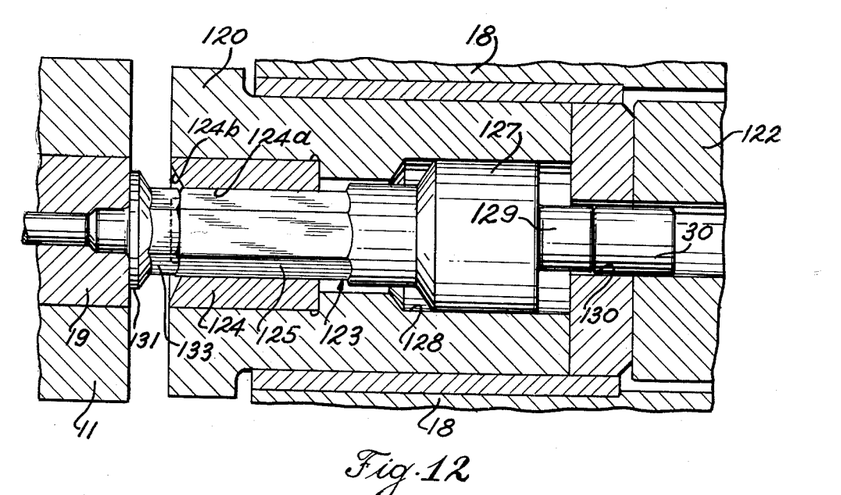
FIG. 12 is a similar view showing the finish tool being retracted after the finish blow and showing the knockout lever for the finish tool actuated to disengage the blank from the finish tool.

FIGS. 11 and 12, inclusive, illustrate sequential positions of the finish tool apparatus which is adapted to be used in the instant invention. A finish tool or punch 120 is suitably mounted in the punch holder 18. The punch 120 is provided with a holding die 124 which is adapted to embrace the projecting head 101 of the blank seated in the bed frame die 19. The holding die has a hexagonal cavity 124a which terminates at the front end of this die in an enlarged frusto-conical cavity portion 124b.

An annular back-up plate, 121 engages the back end of punch 120. This back-up plate, in turn, is engaged by a part 122 which is rigidly backed up in the header slide by plate 85.

A knock-out 123 is slidably mounted in the punch 120 and has a hexagonal front end portion 125 which is slidably received in the hexagonal cavity 124a in the holding die. This front end portion of the knock-out has a forwardly projecting, reduced diameter, cylindrical nose 126 for forming a shallow cylindrical indentation in the blank.

The knock-out 123 also has an enlarged cylindrical portion 127 which is slidable in a cylindrical counterbore 128 in the punch 120.

At its rear end the knock-out has a smaller diameter segment 129 which extends loosely through a bore 130 in back-up plate 121 and is positioned to be engaged by the lever 30.

In the forward stroke of this punch, the punch body 120 and the knock-out 123 are backed up by the back-up plate 121, which in turn is backed up by the part 122 carried by the header slide. The blank is deformed to the shape shown in FIG. 11, with the previously upset head 101 being further upset to provide a short cylindrical portion 131 between the die 19 in the die breast and the holder die 124 in the punch, a short frusto-conical portion 132 conforming to the surface 124b in the holding die, and a longer hexagonal portion 133 conforming to the hexagonal cavity 124a in the holding die and having in its free end face a circular indentation 134 conforming to the nose 126 on the end of the knock-out 123.

When the header slide is retracted, as shown in FIG. 12, the lever 30 is actuated to push the knock-out 123 forward in the punch 120 and thereby unseat the blank from the holding die 124 in the punch and maintain it seated in the die 19 in the die breast.

This operation is carried out so as to insure that the blank will remain in the die breast as the header slide retracts, even though the shank portion of the blank may have very small frictional surfaces as compared to the frictional surfaces on the upset head.

The novel positive knock-out arrangement of the present invention may be used on double blow headers to form various products other than the particular hex washer head bolt shown being formed in FIGS. 9–12. Wherever extreme upsets of the blank are involved, with a substantial portion of blank remaining in the tool, the present invention will be found to be advantageous to insure a positive knock-out of the blank from the tools.

Although I have shown and described my invention in considerable detail, it will be appreciated by those skilled in the art that numerous variations may be made therein and that double-blow headers of various types may be equipped with knock-out levers so that each of the header slide punches are constructed and arranged to achieve the advantages disclosed herein. The variations referred to may be accomplished without departing from the scope of the following claims.

What is claimed is:

1. A header comprising a frame, a die mounted on said frame, a header slide reciprocable on said frame, first drive means connected to reciprocate said header slide toward and away from said die, a tool carrier mounted on said slide for shifting movement relative thereto, a plurality of tool assemblies mounted on said tool carrier adapted to sequentially engage and work a blank in said die on sequential strokes of said header slide, second drive means connected to said first drive means and said tool carrier operable to shift said tool carrier to operative positions wherein said tool assemblies sequentially work a blank in said die, an actuator bar movable in said frame connected by an actuator drive to said first drive for movement relative to said frame at the same cyclic rate of said header slide, each tool assembly including a lever pivoted thereon and positioned in the same predetermind location relative to said header slide each time its associated tool assembly is shifted by said tool carrier into the operating position in which it works a blank in said die, a knock-out in at least one of said tool assemblies engageable with the associated lever and operable to engage a blank in said die, stop means operable to limit rearward movement of said knock-out beyond a maximum rearward position it assumes during work of said blank by the associated tool assembly, each lever having a cam surface engageable with said actuator when the associated tool assembly is in engagement wtih said blank in said die; said actuator drive, said lever cam surfaces and said knock-out being proportioned so that said actuator engages said cam surface and moves said lever relative to its associated tool assembly in a manner holding said knock-out substantially stationary relative to said die as the associated tool assembly commences to move back from said die with the header slide after working said blank therein.

2. A header comprising a frame, a die breast on said frame, a header slide reciprocable on said frame, first drive means connected to reciprocate said header slide toward and away from said die breast, a tool carrier mounted on said slide for reciprocating movement relative thereto, a plurality of tool mountings on said tool carrier adapted to support tools and sequentially position such tools to engage and work a blank in said die breast on sequential strokes of said header slide, second drive means connected to said first drive means and said tool carrier operable to shift said tool carrier to predetermined work positions, an actuator bar slidable in said frame perpendicular to the direction of reciprocation of said header slide and connected by an actuator drive to said first drive for movement relative to said frame at the same cyclic rate of said header slide, each tool mounting including a lever pivoted thereon and sequentially positioned in the same predetermined location relative to said header slide each time its associated tool mounting is shifted by said tool carrier into said predetermined work position, each lever being adapted to operate a knock-out in each of said tool mountings to engage a blank in said die breast, each lever having a cam surface engageable with said actuator when each lever is in said same predetermined location, said actuator drive and said lever cam surface being proportioned so that said actuator engages said cam surfaces and moves each lever relative to its associated tool mounting in a manner adapted to hold associated knock-outs substantially stationary relative to said die breast as the header slide moves back from said die after working said blank therein.

3. A header comprising a frame, a header slide reciprocable on said frame between a forward position and a rearward position, first drive means connected to reciprocate said header slide, a tool carrier mounted on said slide for shifting movement relative thereto, a plurality of tool mounts on said tool carrier each adapted to support a tool, second drive means connected to said tool carrier operable to shift said tool carrier in timed relationship to the reciprocation of said header slide into sequential operating positions, an actuator member movable on said frame and connected by an actuator drive to said first drive for movement relative to said frame at the same cyclic rate as the reciprocation of said header slide, each tool mounting including an element thereon positioned in the same predetermined location relative to said header slide each time its associated tool mounting is shifted by said tool carrier into its operating position, each element being adapted to operate a knock-out in a die assembly carried by the associated tool mount, each element having a cam surface engageable with said actuator member when said header slide is adjacent said forward position and the associated tool mount is in its operating position, said actuator drive and each of said element cam surfaces being proportioned so that said actuator sequentially engages said cam surfaces and moves each element relative to its associated tool mount in a manner adapted to hold an associated knock-out in and against movement relative to said header slide in predetermined locations relative to said frame as the header slide moves back from said forward position.

References Cited in the file of this patent

UNITED STATES PATENTS

| | | |
|---|---|---|
| 1,026,082 | Duston | May 14, 1912 |
| 1,955,061 | Friedman | Apr. 17, 1934 |
| 2,265,428 | Hogue | Dec. 9, 1941 |
| 2,271,257 | Friedman | Jan. 27, 1942 |
| 2,296,693 | Wilcox | Sept. 22, 1942 |
| 2,303,780 | Wilcox | Dec. 1, 1942 |
| 2,305,049 | Wilcox | Dec. 15, 1942 |
| 2,599,053 | Friedman | June 3, 1952 |